US012750197B2

(12) United States Patent
Baykas et al.

(10) Patent No.: US 12,750,197 B2
(45) Date of Patent: Sep. 29, 2026

(54) COMMUNICATIONS USING MILLIMETER WAVES

(71) Applicant: Comcast Cable Communications, LLC, Philadelphia, PA (US)

(72) Inventors: Tuncer Baykas, Reston, VA (US); Jeongki Kim, Seoul (KR); Esmael Hejazi Dinan, McLean, VA (US); Leonardo Alisasis Lanante, Reston, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 261 days.

(21) Appl. No.: 18/498,124

(22) Filed: Oct. 31, 2023

(65) Prior Publication Data

US 2024/0146492 A1 May 2, 2024

Related U.S. Application Data

(60) Provisional application No. 63/420,739, filed on Oct. 31, 2022.

(51) Int. Cl.
*H04L 5/00* (2006.01)
*H04L 25/02* (2006.01)
*H04L 69/22* (2022.01)

(52) U.S. Cl.
CPC ........ *H04L 5/0098* (2013.01); *H04L 25/0202* (2013.01); *H04L 69/22* (2013.01)

(58) Field of Classification Search
CPC .... H04L 5/0098; H04L 25/0202; H04L 69/22
See application file for complete search history.

(56) References Cited

U.S. PATENT DOCUMENTS 9,438,333 B2 * 9/2016 Seok ..................... H04W 16/26
11,160,081 B2 10/2021 Lomayev et al.
12,022,534 B2 * 6/2024 Chu ..................... H04W 40/244
2016/0329962 A1 11/2016 Lv et al.
2020/0344007 A1 * 10/2020 Chen ..................... H04L 1/1819
2021/0007006 A1 * 1/2021 Chen ..................... H04L 1/1887
2022/0070927 A1 * 3/2022 Lim ..................... H04W 24/10
2022/0271810 A1 * 8/2022 Loghin ................ H04B 7/0695
2025/0192968 A1 * 6/2025 Chun ..................... H04L 5/0094

FOREIGN PATENT DOCUMENTS

WO 2020052784 A1 3/2020

OTHER PUBLICATIONS

Mar. 26, 2024—European Search Report—EP Application No. 23207104.3.
Deng, et al, "IEEE 802.11be—Wi-Fi 7: New Challenges and Opportunities" arXiv:2007.13401v3 [eess.SP] Aug. 3, 2020.
Du, et al, "An Overview on IEEE 802.11bf: WLAN Sensing" arXiv:2207.04859v1 [cs.NI] Jul. 11, 2022.
Zhou, et al, "IEEE 802.11ay based mmWave WLANs: Design Challenges and Solutions" IEEE Communications Surveys & Tutorials • Mar. 2018.
Ward, et al, "IEEE 802.11be Technology Introduction" White paper | Version 01.00, Mar. 2022.

* cited by examiner

*Primary Examiner* — Duc C Ho
(74) *Attorney, Agent, or Firm* — Banner & Witcoff, Ltd.

(57) ABSTRACT

A computing device may communicate with an access point. Data may be communicated using a format such as a physical layer protocol data unit. Different data formats may be used on different frequency bands. A data format may be modified to include one or more additional fields for use with a plurality of frequency bands.

20 Claims, 15 Drawing Sheets

COMMUNICATIONS USING MILLIMETER WAVES

CROSS-REFERENCE TO RELATED APPLICATIONS

This application claims the benefit of U.S. Provisional Application No. 63/420,739, filed on Oct. 31, 2022. The above referenced application is hereby incorporated by reference in its entirety.

BACKGROUND

A station communicates with an access point via a frequency band. A data unit is used to transmit data via the frequency band.

SUMMARY

The following summary presents a simplified summary of certain features. The summary is not an extensive overview and is not intended to identify key or critical elements.

A computing device, such as a station, may communicate with an access point. Data may be communicated via different frequency bands. For example, at least some data transmissions may use lower frequency bands, such as 2.4 GHz, 5 GHz, and/or 6 GHz. At least some other data transmissions may use a higher frequency band, such as 60 GHz or higher frequencies. One or more fields of data may be added to, and/or modified in, a message to accommodate one or more additional frequency ranges. For example, data for lower frequency bands (e.g., 2.4 GHz, 5 GHz, and/or 6 GHz) may be modified to be transmitted on higher frequency bands (e.g., 60 GHz). Data for a higher frequency (e.g., 60 GHz or higher frequencies) may be modified to be transmitted on lower frequency bands (e.g., 2.4 GHz, 5 GHz, and/or 6 GHz). Additionally or alternatively, one or more fields may be added to, and/or modified in, a message to indicate a bandwidth of data transmitted via one or more frequency bands.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
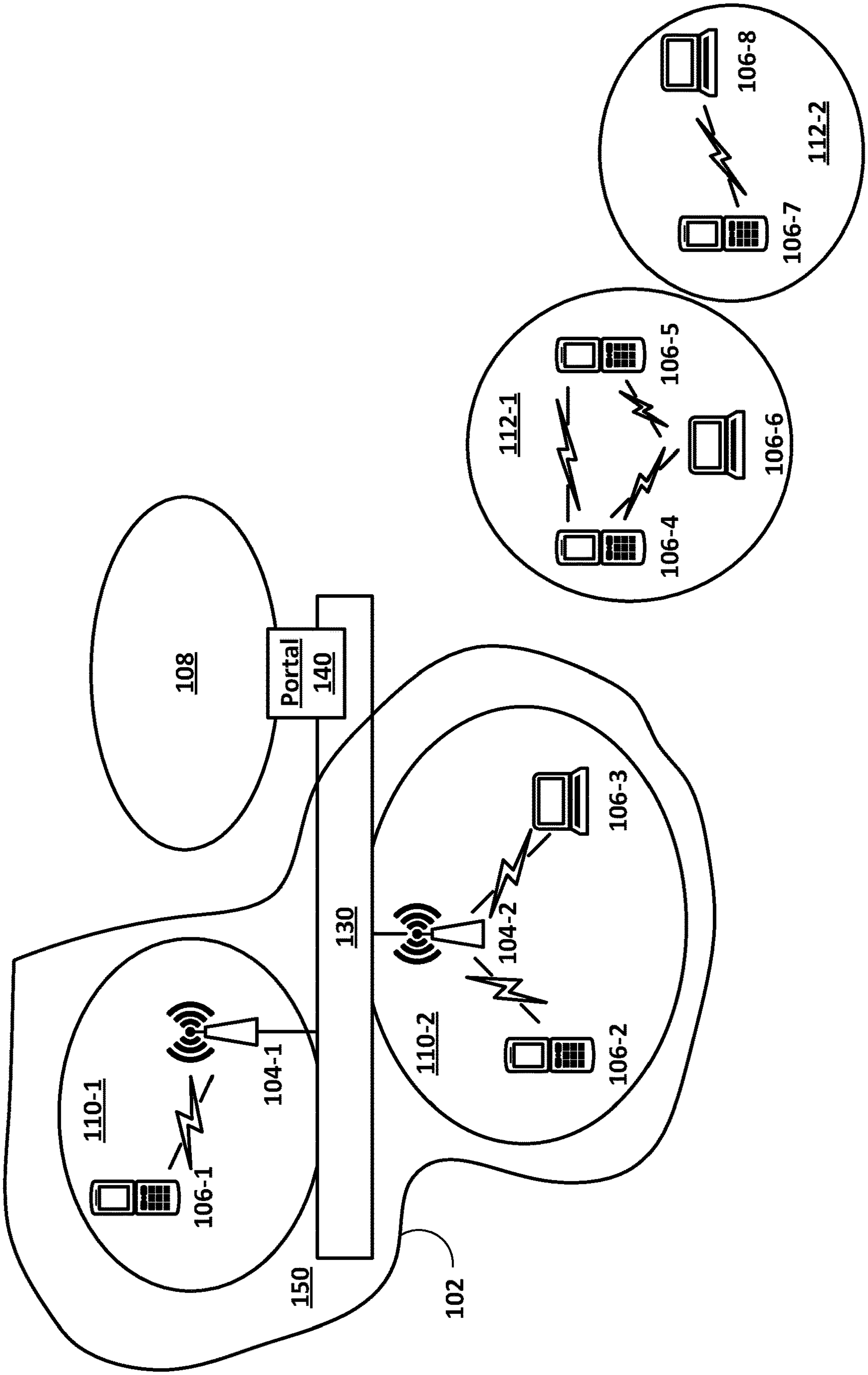
FIG. 1 shows example wireless communication networks.

The accompanying drawings and descriptions provide examples. It is to be understood that the examples shown in the drawings and/or described are non-exclusive, and that features shown and described may be practiced in other examples. Examples are provided for operation of wireless communication systems.

FIG. 1 shows example wireless communication networks. The example wireless communication networks may be a wireless local area network (WLAN) 102. The WLAN 102 may comprise an Institute of Electrical and Electronic Engineers (IEEE) 802.11 infra-structure network, or any other type of communication network. The WLAN 102 may comprise one or more basic service sets (BSSs) 110-1 and 110-2. BSSs 110-1 and 110-2 may each include a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS may be configured to perform an association procedure to communicate with each other.

The WLAN 102 may comprise a distribution system (DS) 130. DS 130 may be configured to connect BSS 110-1 and BSS 110-2. DS 130 may enable an extended service set (ESS) 150 by being configured to connect BSS 110-1 and BSS 110-2. The ESS 150 may be a network comprising one or more Aps (e.g., Aps 104-1 and AP 104-2) that may be connected via the DS 130. The APs included in ESS 150 may have the same service set identification (SSID). WLAN 102 may be coupled to one or more external networks. For example, WLAN 102 may be connected to another network 108 (e.g., 802.X) via a portal 140. Portal 140 may function as a bridge connecting DS 130 of WLAN 102 with the other network 108.

The example wireless communication networks may also, or alternatively, comprise one or more ad-hoc networks and/or independent BSSs (IBSSs). For example, FIG. 1 shows example IBSSs, where STAs 106-4, 106-5 and 106-6 may be configured to form a first IBSS 112-1 and STAs 106-7 and 106-8 may be configured to form a second IBSS 112-2. An ad-hoc network and/or IBSS is a network that includes a plurality of STAs without a centralized communication device, such as an AP. The plurality of STAs may be configured to communicate without requiring the presence of an AP. For example, the plurality of STAs in the IBSS may communicate with each other using peer-to-peer communication (e.g., not via an AP). IBSSs do not include a centralized management entity (e.g., an AP) configured to perform a centralized management. STAs within an IBSS are managed in a distributed manner. STAs forming an IBSS may be fixed and/or mobile. The STAs (e.g., STAs 106-4, 106-5, 106-6, 106-7, 106-8) may or may not be permitted to access the DS 130 to constitute a self-contained network.

A STA may comprise one or more layers in accordance with the open systems interconnection (OSI) model. For example, STAs may comprise a medium access control (MAC) layer that may be in accordance with a defined standard (e.g., an IEEE 802.11 standard, or any other standard). A physical (PHY) layer interface for a radio medium may include the APs and the non-AP stations (STAs). The STA may comprise one or more of a computing device, a mobile terminal, a wireless device, a wireless transmit/ receive unit (WTRU), user equipment (UE), a mobile station (MS), a mobile subscriber unit, and/or a user device. For example, with respect to wireless LAN communications, a device participating in uplink multi-user, multiple input, multiple output (MU-MIMO) and/or uplink orthogonal frequency division multiple access (OFDMA) transmission may be referred to as a STA. STAs may not be limited to only participating in wireless LAN communications, and may perform other types of communications, operations, and/or procedures.

A frequency band to be used for communication may include multiple sub-bands and/or frequency channels. For example, messages (e.g., data packets, physical layer protocol data units (PPDUs)) conforming to the IEEE 802.11 standard (e.g., IEEE 802.11n, 802.11ac, 802.11ax, 802.11be, etc., standards) may be sent (e.g., transmitted) over the 2.4, 5 GHz, and/or 6 GHz bands. Each of the bands may be divided into multiple 20 MHz channels. PPDUs conforming to the IEEE 802.11 standard may be sent, for example, via a physical channel with a minimum bandwidth of 20 MHz. Larger channels may be formed through channel bonding. For example, the PPDUs may be sent via physical channels with bandwidths of 40 MHz, 80 MHz, 160 MHz, 520 MHz, or any other frequency greater than 20 MHz, by bonding together multiple 20 MHz channels.

A PPDU may be a composite structure that may comprise a PHY preamble and a payload in the form of a physical layer convergence protocol (PLCP) service data unit (PSDU). For example, the PSDU may comprise a PLCP preamble, a header, and/or one or more MAC protocol data units (MPDUs). Information indicated by the PHY preamble may be used by a receiving device to decode subsequent data in the PSDU. Preamble fields may be duplicated and sent in each of multiple component channels in a bonded channel, for example, if the PPDU is sent via the bonded channel. The PHY preamble may comprise both a legacy portion (e.g., a legacy preamble) and a non-legacy portion (e.g., a non-legacy preamble). The legacy preamble may be used for packet detection, automatic gain control and channel estimation, etc. The legacy preamble also may generally be used to maintain compatibility with legacy devices. The information provided in, and the format and coding of the non-legacy portion of the preamble may be based on the particular IEEE 802.11 protocol to be used to send the payload.

Figure 2:
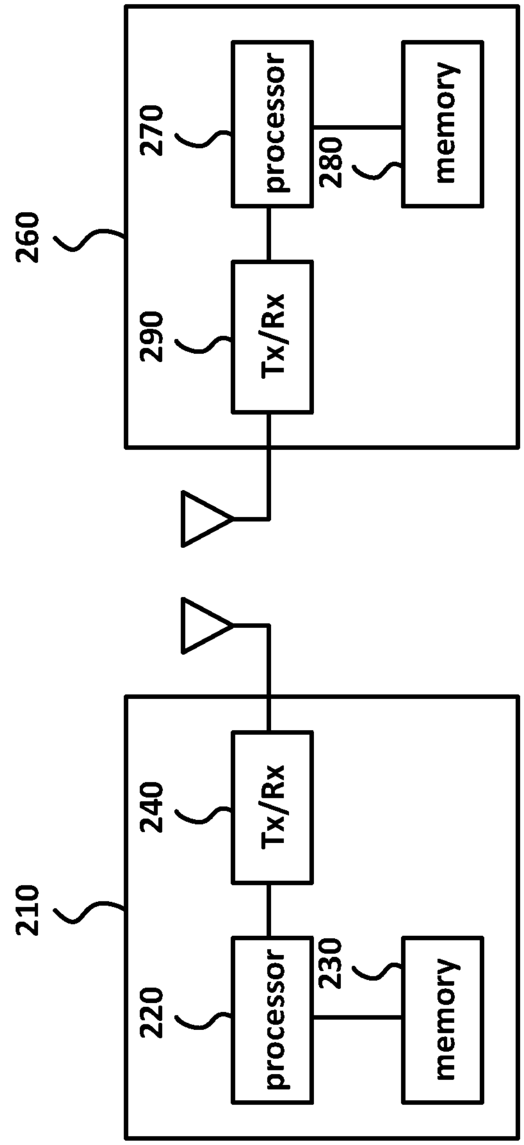
FIG. 2 shows example devices in a communication network.

FIG. 2 shows example devices in a communication network. The communication network of FIG. 2 may comprise multiple devices (e.g., communication devices 210 and 260). The communication devices 210 and 260 may perform various functions and procedures as described herein. For example, the communication device 210 may operate as an AP (e.g., an AP STA) and the communication device 260 may operate as a STA (e.g., a non-AP STA). The communication device 210 may operate as a STA (e.g., a non-AP STA) and the communication device 260 may operate as an AP (e.g., an AP STA). Also, or alternatively, the communication device 210 and the communication device 260 may both operate as STAs (e.g., a non-AP STAs) or may both operate as APs (e.g., AP STAs).

The communication device 210 may comprise at least one processor 220, a memory 230, and/or at least one transceiver (e.g., RF unit) 240. The communication device 260 may comprise at least one processor 270, memory 280, and/or at least one transceiver (e.g., RF unit) 290. The transceivers (e.g., transceivers 240, 290) may send/receive radio signals. The transceivers may operate as a PHY layer (e.g., a PHY layer in accordance with an IEEE 802.11 protocol, a 3$^{rd}$ generation partnership project (3GPP) protocol, etc.). The processors (e.g., processors 220, 270) may operate as a PHY layer and/or MAC layer. The processors may be operatively connected to the transceivers, respectively. The communication devices 210 and/or 260 may be a multi-link device (MLD), that is a device capable of operating over multiple links (e.g., as defined by the IEEE 802.11be standard amendment). A MLD has multiple PHY layers. The multiple PHY layers may be implemented using one or more of transceivers 240 and/or 290. Processor 220 and/or 270 may implement functions of the PHY layer, the MAC layer, and/or a logical link control (LLC) layer of the corresponding communication devices 210 and/or 260.

The processors and/or the transceivers may comprise an application specific integrated circuit (ASIC), other chipset, logic circuit, and/or data processor. The memory (e.g., memory 230, 280) may include read-only memory (ROM), random access memory (RAM), flash memory, memory card, storage medium and/or other storage unit. The procedures described herein may be executed by modules that perform various functions described herein (e.g., in accordance with instructions stored in the memory). The modules can be stored in the memory and executed by the processor. The memory may be integrated with the processor or may be external to the processor. The memory may be operatively connected to the processor. The processor may implement the functions, processes and/or methods as described herein. For example, the processor 220 may be implemented to perform operations of the AP as described herein. For example, the processor 270 may be implemented to perform operations of the STA as described herein. The memory may store instructions that, when executed by one or more processors, cause the communication device to perform methods as described herein. For example, the memory may be a non-transitory computer-readable medium comprising instructions that, when executed by the one or more processors, cause the one or more processors to perform methods and operations described herein. For example, the memory 230 may store instructions that, when executed by the processor 220, cause the processor 220 to perform operations of the AP as described herein. For example, the memory 280 may store instructions that, when executed by the processor 270, cause the processor 270 to perform operations of the STA as described herein.

Figure 3:
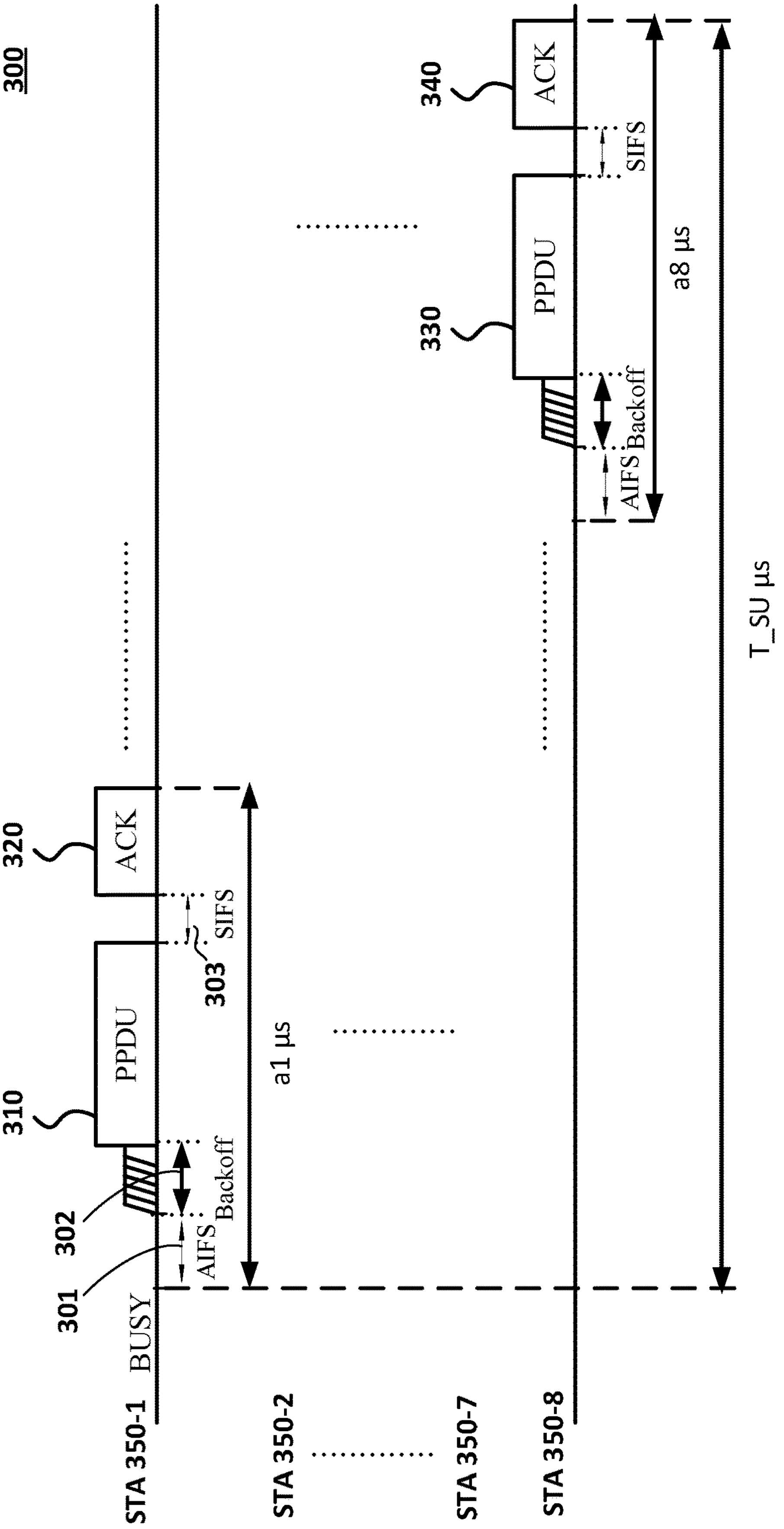
FIG. 3 shows an example for wireless medium access by a plurality of STAs in a Wireless Local Area Network (WLAN).

FIG. 3 shows an example for wireless medium access by a plurality of STAs in a WLAN. As described with respect to FIG. 3, for example, eight or any other value's STAs (e.g., 350-1, . . . , 350-8) may contend for the medium using Enhanced Distributed Channel Access (EDCA). EDCA may be a listen-before-talk access mechanism that may allow exactly one STA to access a channel and to send (e.g., transmit) a PPDU in a given time slot. Before transmission using EDCA, a STA may listen to the channel for a minimum of an Arbitration Interframe Space (AIFS) duration to determine whether the channel state may be IDLE. This listening time for determining whether the channel may be IDLE may be followed by one or more backoff slots before the STA may attempt to send (e.g., transmit) over the channel. The number of backoff slots may be selected randomly by the STA. This random selection may reduce the probability of multiple STAs attempting to send (e.g., transmit) at the same time, which may result in a packet detect error. If the PPDU sent (e.g., transmitted) by the STA may be received successfully, for example, by an AP (not shown in FIG. 3), the AP may respond with an acknowledgement (ACK) frame after a Short Interframe Space (SIFS) duration of receiving the PPDU.

As described with respect to FIG. 3, for example 300, STAs 350-1, . . . , 350-8 may access the channel one by one using EDCA. For example, an STA 350-1 may send (e.g., transmit) a PPDU 310 and may receive an ACK frame 320 from an AP. As described with respect to FIG. 3, the total duration of channel access by the STA 350-1 may include an AIFS duration 301, a backoff period 302, the transmission time of PPDU 310, a SIFS duration 303, and the transmission time of ACK 320. This total duration of channel access by the STA 350-1 may be expressed as, for example, a1 μs. STAs 350-2 to 350-7 each may access the channel using EDCA and may receive a corresponding ACK frame from the AP. The total duration of channel access by the STAs 350-2 to 350-7 may be expressed as a2 μs to a7 μs, respectively. An STA 350-8 may send (e.g., transmit) a PPDU 330 and may receive an ACK frame 340 within a total duration of channel access of a8 μs. Channel access by STAs 350-1, . . . , 350-8 may require a cumulative duration T_SU μs=a1 μs+a2 μs . . . +a7 μs+a8 μs. The T_SU μs duration may represent an average latency of channel access for each STA when the eight STAs may be actively accessing the channel as described with respect to FIG. 3.

Figure 4:
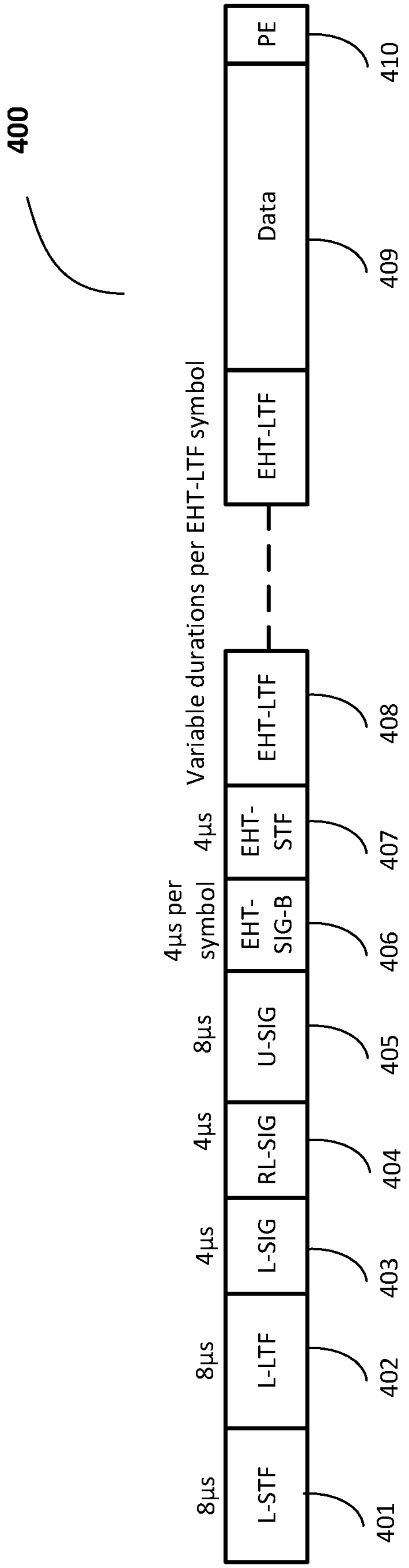
FIG. 4 shows an example of Physical Layer Protocol Data Unit (PPDU) for sub-7 GHz communications.

FIG. 4 shows an example of Physical Layer Protocol Data Unit (PPDU) for sub-7 GHz communications. The PPDU may be used by a device (e.g., STA and/or AP) to send (e.g., transmit) on a wireless medium. The PPDU may be an Extremely High Throughput (EHT) PPDU which may be used by devices conforming to the IEEE 802.11be standard amendment. Such devices may operate in the 2.4, 5, and/or 6 GHz bands. The PPDU 400 may be sent (e.g., transmitted) over a bandwidth of up to 320 MHz. The PPDU 400 may be used by a device for both single user (SU) and multi-user (MU) transmissions.

As described with respect to FIG. 4, a PPDU 400 may include an non-HT Short Training field (L-STF) 401, a non-HT Long Training field (L-LTF) 402, a non-High-Throughput (non-HT) Signal field (L-SIG) 403, a non-HT Repeated Signal field (RL-SIG) 404, a Universal Signal field (U-SIG) 405, an EHT Signal Field B (EHT-SIG-B) 406, an EHT Short Training Field (EHT-STF) 407, one or more EHT Long Training field (EHT-LTF) 408, a Data field 409, and a Packet Extension (PE) field 410.

The L-STF 401 may be used by a receiver of the PPDU 400 to synchronize with the carrier frequency and frame timing of a transmitter of the PPDU 400 and/or to adjust the receiver signal gain. The L-LTF 402 may be used by the receiver of the PPDU 400 to estimate channel coefficients, for example, to equalize the channel response (e.g., amplitude and phase distortion) in both Signal fields (e.g., the L-SIG 403, the RL-SIG 404, the U-SIG 405, the EHT-SIG-B 406) and the Data field 409 of the PPDU 400.

The L-SIG 403 and the RL-SIG 404 may contain parameters needed to demodulate the Data field 409. The L-SIG 403 may be equalized using the channel coefficients estimated using the L-LTF 402 and demodulated to obtain the demodulation parameters of the Data field 409. The U-SIG 405 may ensure forward compatibility of the PPDU 400. At least some PPDUs that may be backward compatible to IEEE 802.11be may contain the same U-SIG field 405 and/or interpretation. IEEE 802.11be conforming devices may be able to understand at least in part a PPDU developed in a future amendment, for example, if those amendments may contain the U-SIG field as well. The EHT-SIG-B 406 may contain indications per STA of resource unit (RU) allocations. A receiving STA may use the indications in the EHT-SIG to locate its payload in the Data field of PPDU 400.

The EHT-STF 407 and the one or more EHT-LTFs 408 may be used by the receiver of the PPDU 400 to estimate channel coefficients, for example, to equalize the channel response (e.g., amplitude and phase distortion) in the Data field 409 of the PPDU 400. The Data field 409 may contain one or more payloads carried by the PPDU 400. The PE field 410 may be an extension of the PPDU 400 that may be designed to give the receiver of the PPDU 400 sufficient time to respond, for example, if receiving the PPDU 400.

Figure 5:
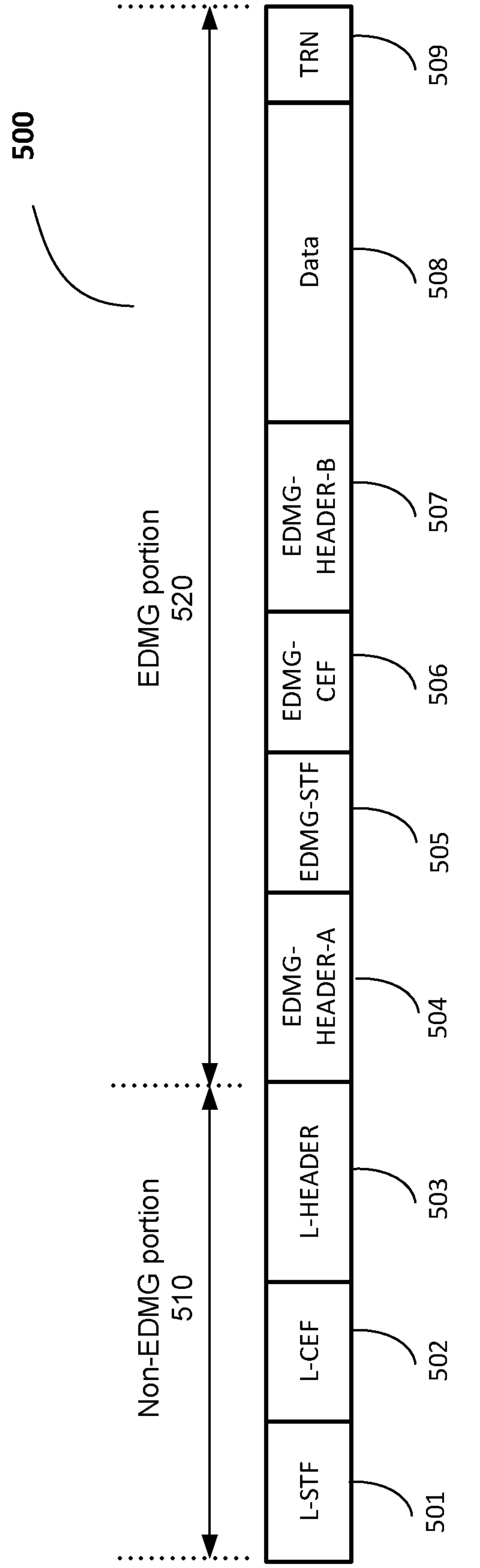
FIG. 5 shows an example of Physical Layer Protocol Data Unit (PPDU) for mmWave communications.

FIG. 5 shows an example PPDU for mmWave communications. The PPDU may be used by a device (STA or AP) to send (e.g., transmit) on a wireless medium. The PPDU may be an Enhanced Directional Multi-Gigabit (EDMG) PPDU which may be used by devices conforming to the IEEE 802.11ay standard amendment. Such devices may operate in the 60 GHz band. The PPDU may be sent (e.g., transmitted) over a bandwidth of up to 8.64 GHz. The PPDU may be used by a device for both SU and MU transmissions.

As described with respect to FIG. 5, a PPDU 500 may include a non-EDMG portion 510 and/or an EDMG portion 520. The non-EDMG portion 510 may include a legacy Short Training field (L-STF) 501, a legacy Channel Estimation field (L-CEF) 502, and/or a legacy Header field (L-Header) 503. The EDMG portion 520 may include an EDMG-Header-A field 504, an EDMG Short Training field (EDMG-STF) 505, an EDMG Channel Estimation field (EMDG-CEF) 506, an EDMG-Header-B field 507, a Data field 508, and/or a Training field (TRN) 509.

The non-EDMG portion 510 may be provided in the PPDU 500, for example, to enable backward compatibility with devices conforming to the IEEE 802.11ad standard amendment. Such devices may also operate, for example, in the 60 GHz band. The L-STF 501 and/or the L-CEF 502 may be provided, for example, to enable detection by such devices of the PPDU 500 and/or the acquisition of carrier frequency and timing. The L-Header 503 may contain similar information (e.g., with one or more bits re-defined) to a corresponding legacy header field used in an IEEE 802.11ad PPDU.

The EDMG portion 520 may be provided in the PPDU 500, for example, to allow interpretation by IEEE 802.11ay devices of the PPDU 500. The EDMG-Header-A field 504 may carry information that may be required to determine the bandwidth, modulation and coding scheme (MCS), and/or quantity/number of spatial streams of the PPDU 500. The EDMG-STF 505 and/or the EDMG-CEF field 506 may be present if channel bonding and/or MIMO communication may be used in the transmission of the PPDU 500. The EDMG-STF 505 and/or the EDMG-CEF 506 may be used, for example, to estimate the channel. The EDMG-Header-B 507 may be present if multi-user (MU) MIMO (MU-MIMO) may be used in the transmission of the PPDU 500. The Data field 508 may contain one or more payloads that may be carried by the PPDU 500. Bits to be sent (e.g., transmitted) may be padded with zeros if necessary, scrambled, encoded, and modulated. The TRN field 509 may enable transmit and receive beamforming training and may be appended to the PPDU 500 if beamforming may be used.

In at least some wireless communication standards (e.g., such as IEEE 802.11ad, IEEE 802.11ay and/or IEEE 802.11be), the standards may be designed to operate at different frequency bands. The different frequency bands may comprise a wide range of frequency bands, such as sub-1 GHz, TV Whitespace (TVWS), 2.4 GHz, 5 GHz, 6 GHz, 45 GHz (e.g., China mmWave), 60 GHz, and/or Infrared. For example, during the development of the IEEE 802.11be standard amendment, multi-link operation (MLO)

may have been developed for sub-7 GHz bands (e.g., 2.4 GHz, 5 GHz, and/or 6 GHz bands). MLO may allow an access point (AP) conforming to the IEEE 802.11be standard amendment to support more than one sub-7 GHz band. For example, some standard amendments such as for mmWave communication (e.g., IEEE 802.11ay) may use a standalone PPDU designed only for 60 GHz band (or any other frequency band). Some standard amendments may not focus on MLO and/or may not design a PPDU for certain frequency bands such as sub-7 GHz bands (e.g., 2.4 GHz, 5 GHz, and/or 6 GHz bands). For example, an IEEE 802.11ay PPDU (e.g., 60 GHz PPDU such as mmWave PPDU) may not be used for sub-7 GHz bands. Additionally, an IEEE 802.11be PPDU (e.g., sub-7 GHz PPDU) may not be used for 60 GHz band. The base bandwidth of an 802.11be PPDU may be 20 MHz, which may be low for 60 GHz systems or any other higher frequency band systems.

As described herein, data formats are provided that may be used for a wide range of frequency bands, such as both sub-7 GHz and 60 GHz systems. For example, a PPDU design described herein may enable MLO for both sub-7 GHz and 60 GHz bands. A 60 GHz PPDU such as described herein may support sub-7 GHz bands such as enhanced resource allocation with OFDMA, sounding implicit channel, and/or MLO. As described herein, a mmWave PPDU for 60 GHz (e.g., IEEE 802.11ay PPDU) may integrate one or more features of the sub-7 GHz bands for the MLO. For example, L-STF, L-CEF, and L-Header fields of the current mmWave PPDU for 60 GHz (e.g., IEEE 802.11ay PPDU) may be used for backward compatibility. U-SIG field of the current mmWave PPDU for 60 GHz (e.g., IEEE 802.11ay PPDU) may be modified for sub-7 GHz functionality (e.g., the IEEE 802.11be PPDU) such as MLO. Additionally or alternatively, sub-7 GHz PPDU (e.g., IEEE 802.11be PPDU) may be designed for 60 GHz band. For example, U-SIG of the IEEE 802.11be PPDU may be modified to enable signaling of a 60 GHz bandwidth. By modifying the U-SIG of the IEEE 802.11be PPDU, data may be sent (e.g., transmitted) based on a bandwidth value (e.g., such as 60 GHz) indicated in the U-SIG of the IEEE 802.11be PPDU. By modifying a mmWave PPDU for 60 GHz and/or an IEEE 802.11be PPDU, the modified PPDU may be used for both sub-7 GHz and 60 GHz bands.

Figure 6:
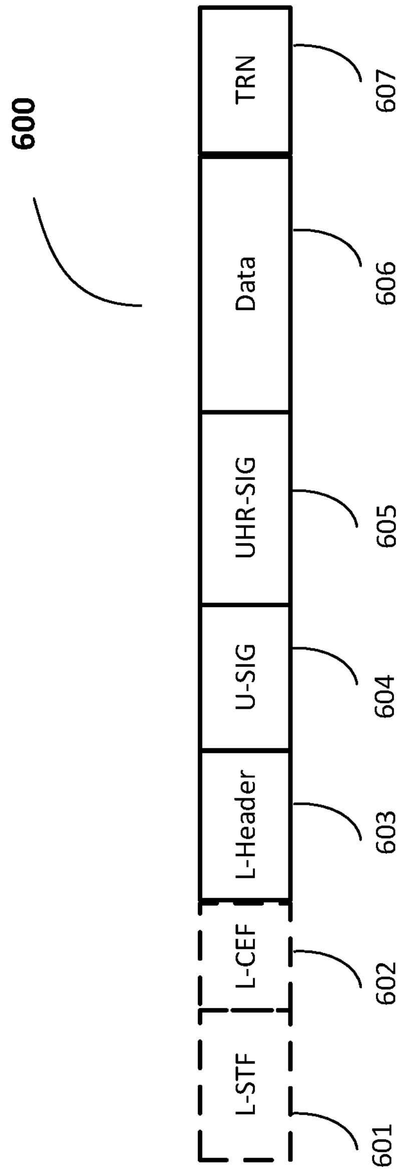
FIG. 6 shows an example PPDU.

FIG. 6. shows an example PPDU. As described with respect to FIG. 6, for example, a PPDU 600 may comprise an optional legacy Short Training field (L-STF) 601, an optional legacy Channel Estimation field (L-CEF) 602, an L-Header field 603, a U-SIG 604, an Ultra High Reliability (UHR) Signal field (UHR-SIG) 605, a data field 606, and/or a TRN field 607. The L-STF 601 and/or the L-CEF 602 may be similar to the corresponding fields in the PPDU 500 described above. The L-STF 601 and/or the L-CEF 602 may enable the IEEE 802.11ad/ay conforming devices to detect the PPDU 600. The PPDU 600 may coexist with the PPDU 500, for example, if both the PPDU 500 and the PPDU 600 may be used in a system operating in the 60 GHz band.

The L-Header 603 may be similar to the corresponding the L-Header field 503 in the PPDU 500 described above, with modifications as further described below. For example, bit 37 (e.g., B37) and bit 46 (e.g., B46) of the L-Header 603 may determine a PPDU type of the PPDU 600. In the IEEE 802.11ad, the PPDU type may be DMG PPDU or DMG A PPDU. In the IEEE 802.11ay, the PPDU type may be EMDG PPDU or EDMG A PPDU. In the PPDU 600 (which may conform to the IEEE 802.11ad/ay), B37 and B46 may have values according to the following mapping, shown in Table 1:

TABLE 1

| B47 | B46 | B37 | Data Field Content |
|---|---|---|---|
| Reserved | 0 | 0 | DMG PPDU |
| Reserved | 0 | 1 | DMG A PPDU |
| Reserved | 1 | 0 | EDMG PPDU |
| Reserved | 1 | 1 | EDMG A PPDU |

For example, bit 47 (e.g., B47) of the PPDU 600 may be reserved for all available PPDU types. As described herein, B47 of the L-Header 603 of the PPDU 600 may be used to support a new PPDU design. For example, B37, B46, and/or B47 may have values according to the following mapping, shown in Table 2:

TABLE 2

| B47 | B46 | B37 | Data Field Content |
|---|---|---|---|
| 0 | 0 | 0 | DMG PPDU |
| 0 | 0 | 1 | DMG A PPDU |
| 0 | 1 | 0 | EDMG PPDU |
| 0 | 1 | 1 | EDMG A PPDU |
| 1 | 0 | 0 | UHR PPDU |
| 1 | 1 | 0 | UHR A PPDU |
| 1 | 0 | 1 | Reserved |
| 1 | 1 | 1 | Reserved |

As described herein, for example, to adapt the PPDU 600 to the IEEE 802.11ad/ay operation, B47 may be set to 0, and B37 and B46 may be set according to the existing mapping of the IEEE 802.11ad/ay as described above. For example, to use PPDU 600 for 60 GHz operation, B47 may be set to 1. B37 and B46 may be both set to 0 to indicate a UHR PPDU. B37 and B46 may be set to 0 and 1, respectively, to indicate a UHR A-PPDU (e.g., a PPDU with more than one MPDU). The option of B37 set to 1 and B46 set to 0 and the option of B37 set to 1 and B46 set 1 may be reserved, for example, to support other UHR PPDU types.

The U-SIG 604 may help to ensure forward compatibility of the PPDU 600. Any other PPDUs that may be backward compatible to the IEEE 802.11be may contain the same U-SIG field 604 and/or interpretation. The IEEE 802.11be conforming devices may be able to understand at least in part a PPDU that may contain the U-SIG field 604.

The U-SIG 604 may be similar to the corresponding the U-SIG 405 of the PPDU 400 described above, with modifications as further described below. Table 3 may show the assignments of a number of bits of the U-SIG 405 of the PPDU 400 (e.g., in total, the U-SIG 405 of the PPDU 400 may contain 52 bits).

TABLE 3

| Bit | Field | Number of Bits | Description |
|---|---|---|---|
| B0-B2 | PHY Version Identifier | 3 | Set 0 for EHT PPDU<br>Values 1-7 are Validate |
| B3-B5 | Bandwidth | 3 | Set 0 to for 20 MHz<br>Set 1 to for 40 MHz<br>Set 2 to for 80 MHz<br>Set 3 to for 160 MHz<br>Set 4 to for 320 MHz-1<br>Set 5 to for 320 MHz-2<br>Values 6-7 are Validate |

As shown in Table 3, B0-B2 may correspond to a PHY Version Identifier field. The PHY Version Identifier field may be set to 0 for an EHT PPDU (e.g., the PPDU 400). As shown in Table 1, B3-B5 may correspond to a Bandwidth field. The Bandwidth field may indicate the bandwidth of the PPDU. The Bandwidth field may be set to the values 0-5 to indicate respectively a bandwidth of 20 MHz, 40 MHz, 80 MHz, 160 MHz, 320 MHz-1 (e.g., transmission type 1), and 320 MHz-2 (e.g., transmission type 2).

As described herein, the assignments of B0-B5 of the U-SIG 604 may be modified in the PPDU 600 relative to the PPDU 400. For example, the assignments of B0-B5 of the U-SIG 604 may be as provided in Table 4. For example, B0-B2, which may correspond to the PHY Version Identifier field, may have the value 0 for an EHT PPDU (e.g., the PPDU 400), and the value 1 for a UHR PPDU. For example, if the PPDU may be an EHT PPDU (B0-B2 set to 0), the Bandwidth field, which may indicate the bandwidth of the PPDU, may have the values 0-5 to indicate respectively a bandwidth of 20 MHz, 40 MHz, 80 MHz, 160 MHz, 320 MHz-1 (e.g., transmission type 1), and 320 MHz-2 (e.g., transmission type 2). For example, if the PPDU may be a UHR PPDU (B0-B2 set to 1), the Bandwidth field may have the values 0-7 to indicate respectively a bandwidth of 80 MHz, 160 MHz, 320 MHz, 640 MHz, and 1.28 GHz, 2.56 GHz, 5.12 GHz and 10.24 GHz.

TABLE 4

| Bit | Field | Number of Bits | Description |
|---|---|---|---|
| B0-B2 | PHY Version Identifier | 3 | Set 0 for EHT PPDU<br>Set 1 for UHR PPDU<br>Values 2-7 are Validate |
| B3-B5 | Bandwidth | 3 | For sub-7 GHz bands,<br>Set 0 to for 20 MHz<br>Set 1 to for 40 MHz<br>Set 2 to for 80 MHz<br>Set 3 to for 160 MHz<br>Set 4 to for 320 MHz-1<br>Set 5 to for 320 MHz-2<br>Set 3 to for 640 MHz<br>Set 4 to for 1.28 GHz<br>For bands above 45 GHz,<br>Set 0 to for 80 MHz<br>Set 1 to for 160 MHz<br>Set 2 to for 320 MHz<br>Set 3 to for 640 MHz<br>Set 4 to for 1.28 GHz<br>Set 5 to for 2.56 GHz<br>Set 6 to for 5.12 GHz<br>Set 7 to for 10.24 GHz |

For example, the assignments of B0-B5 of the U-SIG 604 may be set as shown in Table 5. For example, B3-B5 may be set to the values 0-7 (e.g., independent of the values of B0-B2) to indicate respectively a PPDU bandwidth of 20 MHz, 40 MHz, 80 MHz, 160 MHz, 320 MHz-S (e.g., transmission type 1), and 320 MHz-2 (e.g., transmission type 2), 640 MHz, and 1.28 GHz. For example, B3-B7 may be set to the values 0-7 (e.g., independent of the values of B0-B2) to indicate respectively a PPDU bandwidth of 20 MHz, 40 MHz, 80 MHz, 160 MHz, 320 MHz-1 (e.g., transmission type 1), and 320 MHz-2 (e.g., transmission type 2), 640 MHz, and 1.28 GHz.

TABLE 5

| Bit | Field | Number of Bits | Description |
|---|---|---|---|
| B0-B2 | PHY Version Identifier | 3 | Set 0 for EHT PPDU<br>Set 1 for UHR PPDU<br>Values 2-7 are Validate |
| B3-B5 | Bandwidth | 3 | Set 0 to for 20 MHz<br>Set 1 to for 40 MHz<br>Set 2 to for 80 MHz<br>Set 3 to for 160 MHz<br>Set 4 to for 320 MHz-1<br>Set 5 to for 320 MHz-2<br>Set 6 to for 640 MHz<br>Set 7 to for 1.28 MHz |

The UHR-SIG field 605 may contain indications per STA of RU allocations. A receiving STA may use the indications in the UHR-SIG 605 to locate its payload in the Data field 606 of the PPDU 600. The UHR-SIG field 605 may also be used for other indications related to the Data field 606 (e.g., modulation and coding scheme (MCS), data type, length, etc.). The Data field 606 may contain one or more payloads that may be carried by the PPDU 600. The TRN field 607 may include information necessary for beamforming training.

Figure 7:
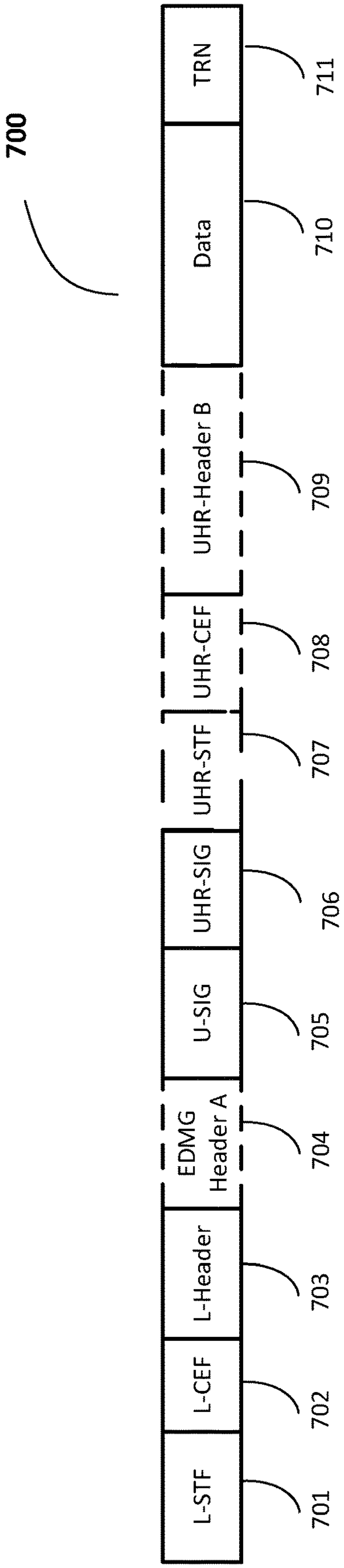
FIG. 7 shows an example PPDU.

FIG. 7 shows an example PPDU. As described with respect to FIG. 7, for example, a PPDU 700 may comprise a legacy Short Training field (L-STF) 701, a legacy Channel Estimation field (L-CEF) 702, an L-Header field 703, an optional EDMG Header-A field 704, a U-SIG 705, a UHR-SIG 706, an optional UHR Short Training field (UHR-STF) 707, an optional UHR Channel Estimation field (UHR-CEF) 708 (or UHR Long Training Field (UHR-LTF) (not shown in FIG. 7)), an optional UHR Header-B field 709, a data field 710, and a TRN field 711.

The L-STF 701, the L-CEF 702, the L-Header 703, the U-SIG 705, and the UHR-SIG field 706 may be similar or identical to the corresponding the L-STF 601, the L-CEF 602, the L-Header 603, the U-SIG 604, and the UHR-SIG field 605 of the PPDU 600 described above. For example, the L-Header 703 and the U-SIG 705 may include similar or same modifications as described above with reference to FIG. 6.

The optional EDMG Header-A 704 may be similar or identical to the corresponding the EMDG Header-A field 504 of the PPDU 500 described above. The presence of the EDMG Header-A 704 in the PPDU 700 may improve the detection of the PPDU 700 by the IEEE 802.11ad/ay conforming devices. The PPDU 700 may coexist with the PPDU 500, for example, if both the PPDU 500 and the PPDU 700 may be used in a system operating in the 60 GHz band. The UHR Header-B 709 may include information relating to using the PPDU 700 in MU MIMO communication. The UHR-STF 707 and the UHR-CEF 708 may be used to estimate the channel. The UHR-STF 707 and UHR-CEF 708 may be present, for example, if channel bonding and/or MIMO communication may be used in the transmission of the PPDU 700. The Data field 710 may contain one or more payloads that may be carried by the PPDU 700. The TRN field 711 may include information necessary for beamforming training.

Figure 8:
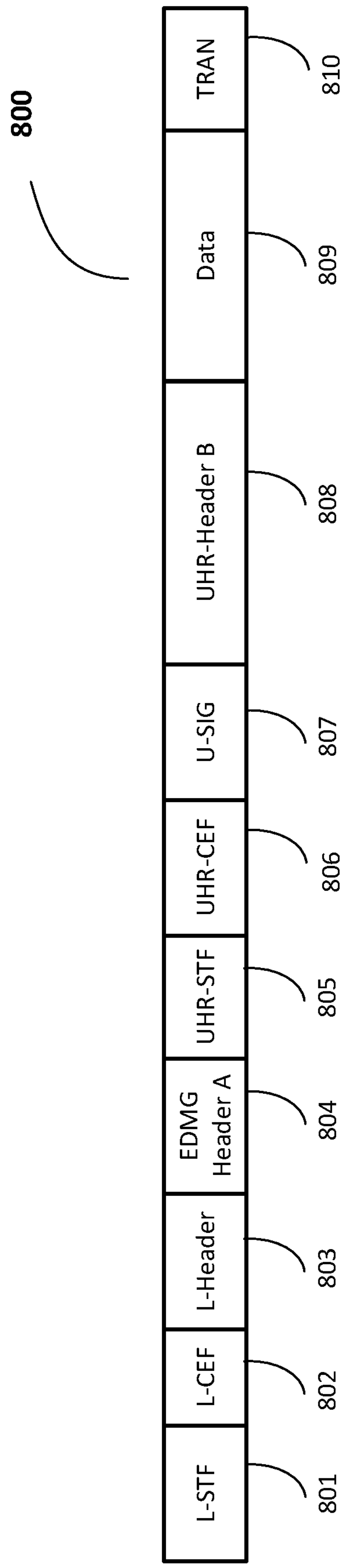
FIG. 8 shows an example PPDU.

FIG. 8 shows an example PPDU. As described with respect to FIG. 8, a PPDU 800 may comprise a legacy Short Training field (L-STF) 801, a legacy Channel Estimation field (L-CEF) 802, an L-Header field 803, an EDMG Header-A field 804, a UHR-STF 805, a UHR-CEF 806 (or UHR-LTF (not shown in FIG. 8)), a U-SIG 807, a UHR Header-B field 808, a data field 809, and a TRN field 810.

The L-STF 801, the L-CEF 802, the L-Header 803, the EDMG Header-A 804, the UHR-STF 805, the UHR-CEF 806, the U-SIG 807, the data 809, and the TRN field 810 may be similar or identical to the corresponding the L-STF 701, the L-CEF 702, the L-Header 703, the EDMG Header-A 704, the UHR-STF 707, the UHR-CEF 708 (or UHR-LTF (not shown in FIG. 7)), the U-SIG 705, the data 710, and the TRN field 711 of the PPDU 700 described above.

The UHR-SIG 706 may be eliminated in the PPDU 800. The UHR Header-B 808 may be modified relative to the UHR Header-B 709 of the PPDU 700, for example, to compensate for the removal of the UHR-SIG 706. For example, the UHR Header-B 808 may be designed to further provide information similar to the UHR-SIG 706. For example, the UHR Header-B 808 may be designed to further include indications per STA of RU allocations. The UHR Header-B 808 may include other indications related to the data field 809 (e.g., modulation and coding scheme (MCS), data type, length, etc.).

As described with respect to FIG. 8, the UHR-STF 805 and the UHR-CEF 806 may be provided before the U-SIG field 807. As the UHR-STF 805 and/or the UHR-CEF 806 (or UHR-LTF (not shown in FIG. 8)) may be used to estimate the channel, this has the effect of improving the acquisition of the U-SIG 807 by a receiving STA. The U-SIG 807 may ensure forward compatibility of the PPDU 800.

Figure 9:
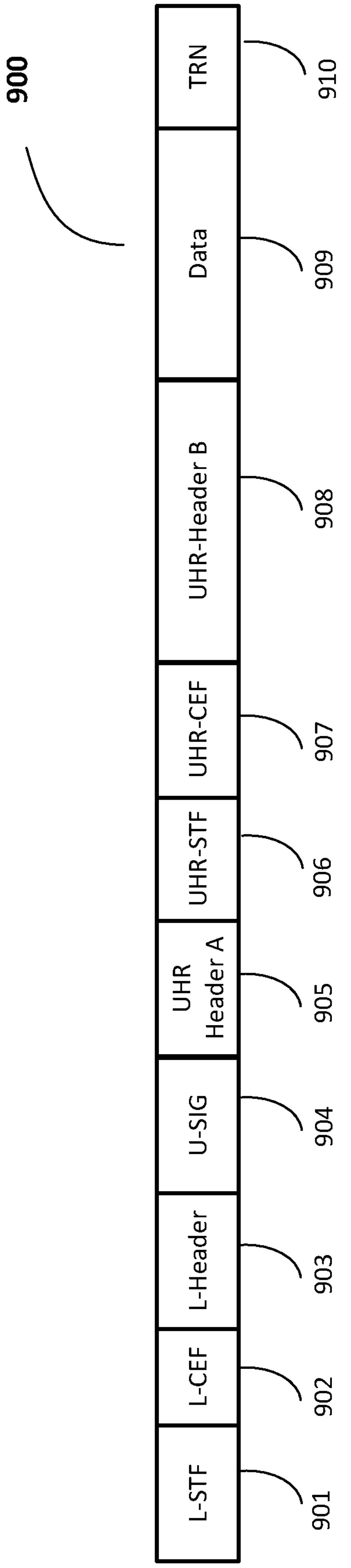
FIG. 9 shows an example PPDU.

FIG. 9 shows an example PPDU. As described with respect to FIG. 9, for example, a PPDU 9 may comprise a legacy Short Training field (L-STF) 901, a legacy Channel Estimation field (L-CEF) 902, an L-Header field 903, a U-SIG 904, a UHR Header-A 905, a UHR-STF 906, a UHR-CEF 907 (or UHR-LTF (not shown in FIG. 9)), a UHR Header-B field 908, a data field 909, and a TRN field 910.

The L-STF 901, the L-CEF 902, the L-Header 903, the U-SIG 904, the UHR-STF 906, the UHR-CEF 907, the UHR Header B 908, the data 909, and the TRN field 910 may be similar or identical to the corresponding the L-STF 701, the L-CEF 702, the L-Header 703, the U-SIG 705, the UHR-STF 707, the UHR-CEF 708 (or UHR-LTF (not shown in FIG. 7)), the UHR Header-B 709, the data 710, and the TRN field 711 of the PPDU 700 described above.

The UHR-SIG 706 may be eliminated in the PPDU 900. To compensate for the removal of the UHR-SIG 706, the UHR Header-A 905 may be designed to provide information similar to the UHR-SIG 706. For example, the UHR Header-A 905 may be designed to include indications per STA of RU allocations. The UHR Header-A 905 may also include other indications related to the data field 909 (e.g., modulation and coding scheme (MCS), data type, length, etc.).

Figure 10:
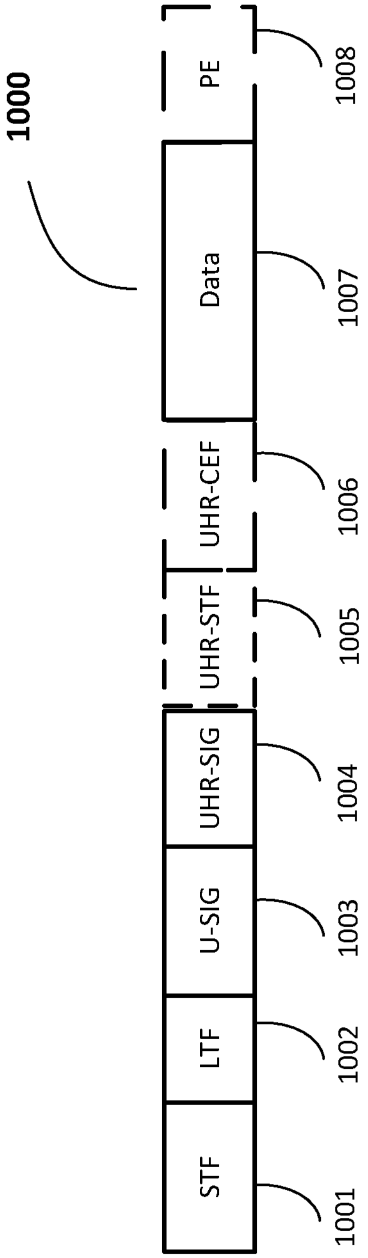
FIG. 10 shows an example PPDU.

FIG. 10 shows an example PPDU. As described with respect to FIG. 10, for example, a PPDU 1000 may comprise a Short Training field (STF) 1001, a Long Training field (LTF) 1002, a U-SIG 1003, a UHR-SIG 1004, an optional UHR-STF 1005, an optional UHR-CEF 1006 (or UHR-LTF (not shown in FIG. 10)), a data field 1007, and a PE field 1008.

The STF 1001 and the LTF 1002 may have a similar role as the L-STF 401 and the L-LTF 402 of the PPDU 400 described above. For example, the STF 1001 may be used by a receiver of the PPDU 1000, for example, to synchronize with the carrier frequency and frame timing of a transmitter of the PPDU 1000 and/or to adjust the receiver signal gain. The LTF 1002 may be used by the receiver of the PPDU 1000, for example, to estimate channel coefficients to equalize the channel response (e.g., amplitude and phase distortion) in both Signal fields (e.g., the U-SIG 1003 and the UHR-SIG 1004) and the Data field 1007 of the PPDU 1000. The STF 1001 and the LTF 1002 may comprise identical information bits as the L-STF 401 and the L-LTF 402 of the PPDU 400. The STF 1001 and the LTF 1002 may not comprise identical information bits (e.g., may comprise different bits) as the L-STF 401 and the L-LTF 402 of the PPDU 400

The U-SIG 1003 and the UHR-SIG 1004 may be similar to the corresponding the U-SIG 604 and the UHR-SIG 605 of the PPDU 600 described above. For example, the U-SIG 1003 may include similar or same modifications as described above with reference to FIG. 6. The optional UHR-STF 1005 and the optional UHR-CEF 1006 (or UHR-LTF (not shown in FIG. 10)) may be similar to the corresponding the UHR-STF 707 and the UHR-CEF 708 of the PPDU 700 of FIG. 7 described above.

As described with respect to FIG. 10, for example, the PPDU 1000 may be adapted, for example, based on the existing sub-7 GHz design described with respect to FIG. 4. The PPDU 1000 may not include fields allowing coexistence with the IEEE 802.11ad/ay PPDUs (e.g., L-STF, L-CEF, L-Header, and EDMG Header-A). For example, the design of the PPDU 1000 may focus on low latency communication by including only those fields necessary for 60 GHz operation. For example, if the PPDU 1000 may be used for 60 GHz operation, the PPDU 1000 may be sent (e.g., transmitted) at a clock rate in accordance with a value of the Bandwidth field of the U-SIG 1003. In accordance with the above-mentioned Bandwidth values, this results in PPDU 1000 being overclocked compared to PPDU 400 used in sub-7 GHz operation.

Figure 11:
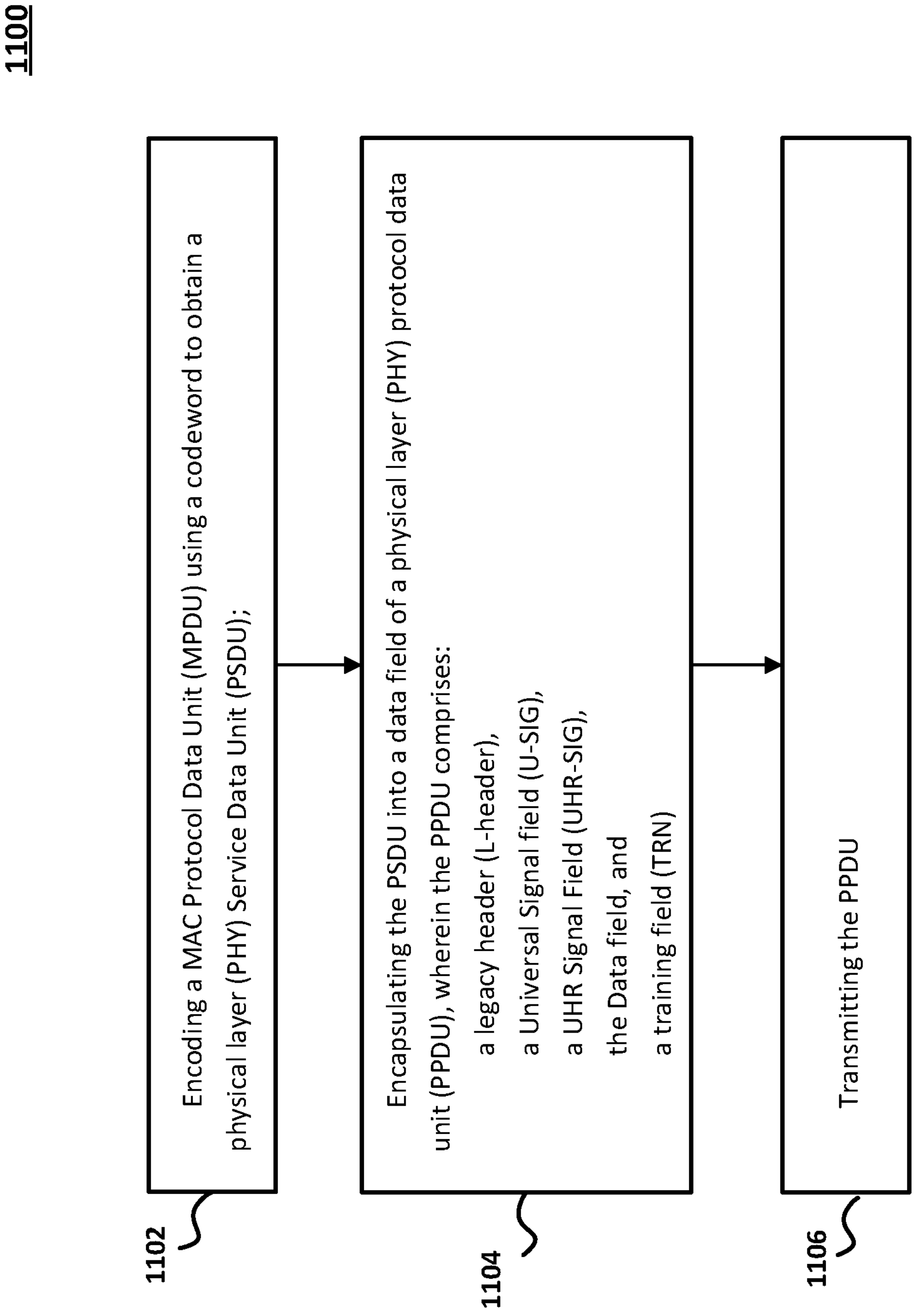
FIG. 11 shows an example method for sending a PPDU.

FIG. 11 shows an example method for sending a PPDU. A process 1100 may be performed by a transmitter. The transmitter may be an AP or a STA. As described with respect to FIG. 11, for example, a step 1102 may include encoding an MPDU using a codeword to obtain a physical layer (PHY) Service Data Unit (PSDU). For example, the codeword may be a Low Density Parity Check (LDPC) codeword. A step 1104 may include encapsulating the PSDU into a data field of a PPDU. For example, the PPDU may comprise a legacy header (L-Header), a Universal Signal field (U-SIG), a UHR Signal Field (UHR-SIG), the data field, and/or a training field (TRN), for example, as in the PPDU 600, the PPDU 700, the PPDU 800, and/or the PPDU 900.

The PPDU may further comprise a legacy Short Training field (L-STF) and/or a channel estimation field (L-CEF) as described with respect to FIG. 6. For example, the L-STF and/or the L-CEF may precede the L-Header. For example, the PPDU may further comprise an EDMG Header-A field. For example, the EDMG Header-A field may precede the U-SIG. For example, the PPDU may further comprise a UHR-STF and a UHR-CEF. For example, the U-SIG may precede the UHR-STF and/or the UHR-CEF. For example, the U-SIG may follow the UHR-STF and the UHR-CEF.

The PPDU may comprise a UHR Header A field. The PPDU may not include a UHR-SIG field. The L-Header may comprise a field indicating whether or not the PPDU may be a UHR PPDU. The U-SIG may comprise a PHY Version Identifier field and/or a Bandwidth field. The PHY Version Identifier field may be set to a first value, for example, to indicate that the Data field may be encoded according to an EHT PHY. The PHY Version Identifier field may be set to a second value, for example, to indicate that the Data field may be encoded according to a UHR PHY. The Bandwidth field may indicate a bandwidth of the PPDU. The U-SIG may be in accordance with the IEEE 802.11be standard amendment.

A bandwidth value of the PPDU may vary depending on a frequency band. For example, if the PPDU may be sent (e.g., transmitted) in a band above 45 GHz, PPDU bandwidth values may include 160 MHz, 320 MHz, 640 MHz, 1.28 GHz, 2.56 GHz, 5.12 GHz, and/or 10.24 GHz. If the PPDU may be sent (e.g., transmitted) in a band below 7 GHz, PPDU bandwidth values may include 20 MHz, 40 MHz, 80 MHz, 160 MHz, 320 MHz, and/or 640 GHz. For example, the Bandwidth field may be set to a value corresponding to a bandwidth of: 20 MHz, 40 MHz, 80 MHz, 160 MHz, 320 MHz, 640 MHz, or 1.28 GHz. For example, the Bandwidth field may be set to a value corresponding to a bandwidth of: 80 MHz, 160 MHz, 320 MHz, 640 MHz, 1.28 GHz, 2.56 GHz, 5.12 GHz, and/or 10.24 GHz. Step 1106 may include sending (e.g., transmitting) the PPDU.

Figure 12:
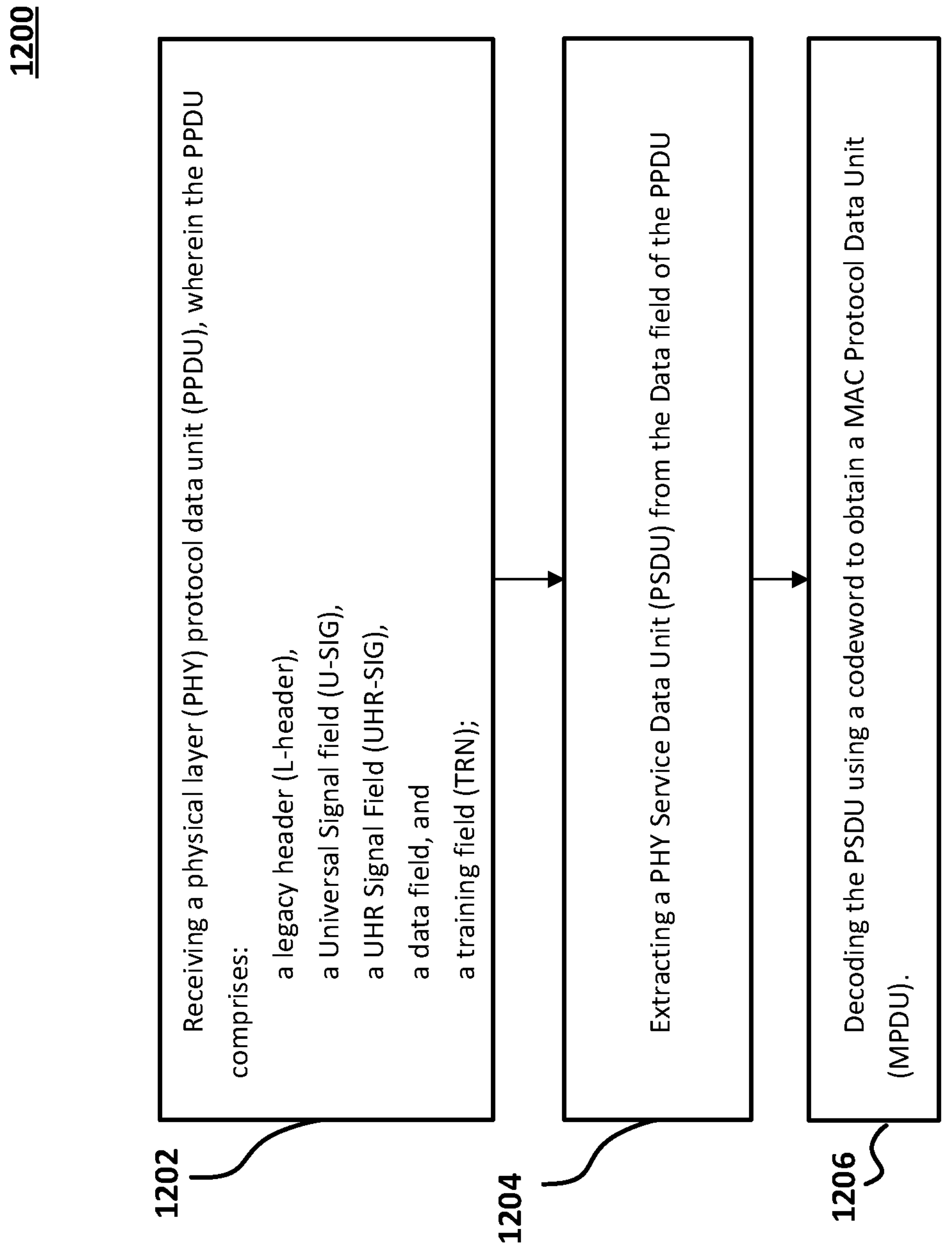
FIG. 12 shows an example method for receiving a PPDU.

FIG. 12 shows an example method for receiving a PPDU. A process 1200 may be performed by a receiver. The receiver may be an AP or a STA. As described with respect to FIG. 12, for example, a step 1202 may include receiving a physical layer (PHY) protocol data unit (PPDU). The PPDU may comprises a legacy header (L-header), a Universal Signal field (U-SIG), a UHR Signal Field (UHR-SIG), a Data field, and/or a training field (TRN), for example as in the PPDU 600, the PPDU 700, the PPDU 800, and/or the PPDU 900.

The PPDU may comprise a legacy Short Training field (L-STF) and a channel estimation field (L-CEF), such as described with respect to FIG. 6. The L-STF and L-CEF may precede the L-Header. The PPDU may further comprise an EDMG Header-A field. The EDMG Header-A field may precede the U-SIG. The PPDU may further comprise a UHR-STF and/or a UHR-CEF. For example, the U-SIG may precede the UHR-STF and/or the UHR-CEF. The U-SIG may follow the UHR-STF and/or UHR-CEF.

The PPDU may comprise a UHR Header A field. The PPDU may not include a UHR-SIG field. The L-header may comprise a field indicating whether or not the PPDU may be a UHR PPDU. The U-SIG may comprise a PHY Version Identifier field and/or a Bandwidth field. For example, the PHY Version Identifier field may be set to a first value, for example, to indicate that the Data field may be encoded according to an EHT PHY. For example, the PHY Version Identifier field may be set to a second value, for example, to indicate that the Data field may be encoded according to a UHR PHY. The U-SIG may be in accordance with the IEEE 802.11be standard amendment.

PPDU bandwidth values may include 160 MHz, 320 MHz, 640 MHz, 1.28 GHz, 2.56 GHz, 5.12 GHz, and/or 10.24 GHz, for example, if the PPDU may be sent (e.g., transmitted) in a band above 45 GHz. If the PPDU may be sent in a band below 7 GHz, PPDU bandwidth values may include 20 MHz, 40 MHz, 80 MHz, 160 MHz, 320 MHz, and/or 640 GHz. The Bandwidth field may be set to a value corresponding to a bandwidth of: 20 MHz, 40 MHz, 80 MHz, 160 MHz, 320 MHz, 640 MHz, or 1.28 GHz. The Bandwidth field may be set to a value corresponding to a bandwidth of: 80 MHz, 160 MHz, 320 MHz, 640 MHz, 1.28 GHz, 2.56 GHz, 5.12 GHz, and/or 10.24 GHz. A step 1204 may include extracting a PSDU from the Data field of the PPDU. A step 1206 may include decoding the PSDU using a codeword to obtain an MPDU. The codeword may be a Low Density Parity Check (LDPC) codeword.

Figure 13:
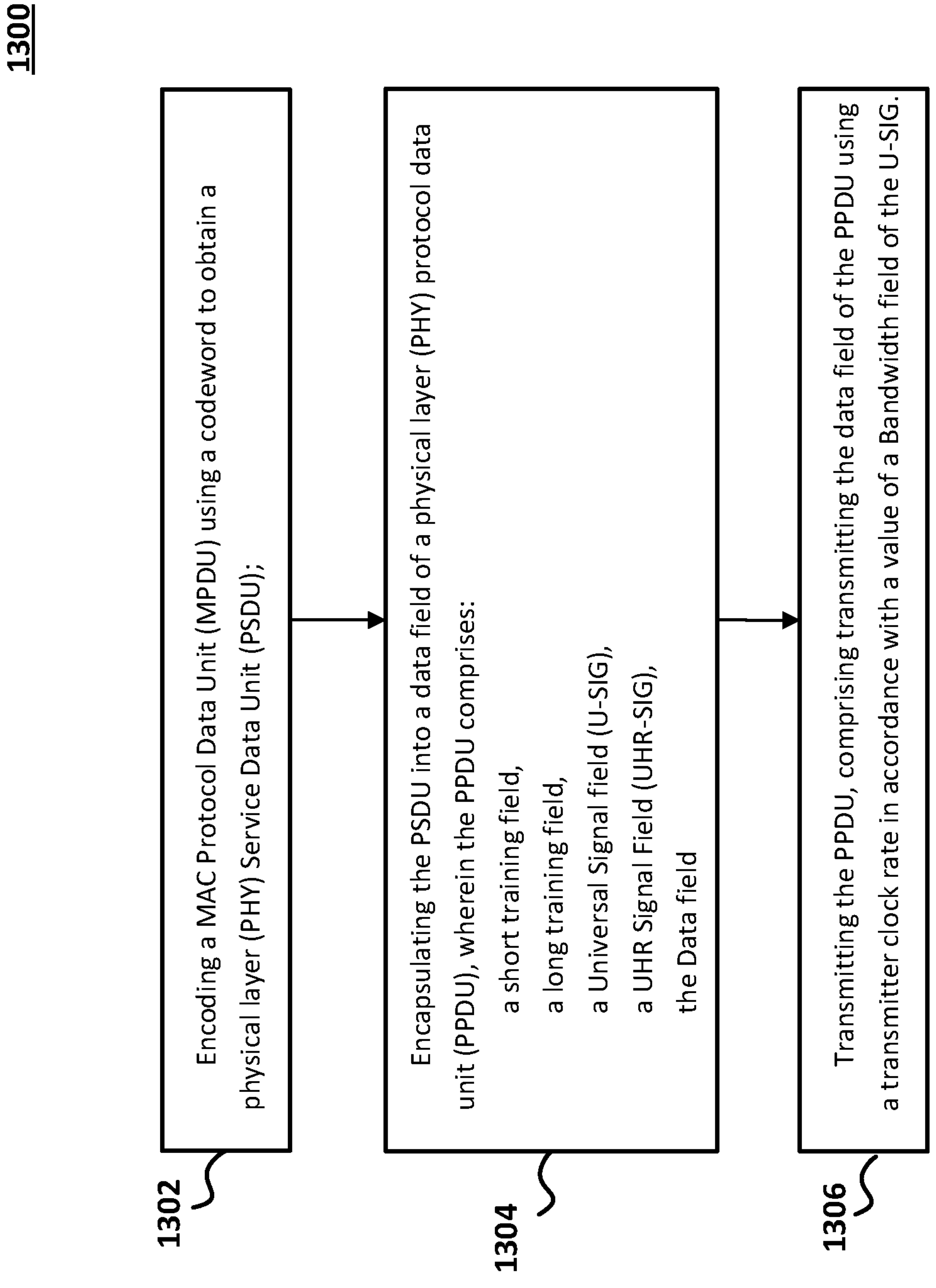
FIG. 13 shows an example method for sending a PPDU.

FIG. 13 shows an example method for sending a PPDU. A process 1300 may be performed by a transmitter. The transmitter may be an AP or a STA. As described with respect to FIG. 13, for example, a step 1302 may include encoding an MPDU using a codeword to obtain a PSDU. The codeword may be a Low Density Parity Check (LDPC) codeword.

A step 1304 may include encapsulating the PSDU into a Data field of a physical layer (PHY) protocol data unit (PPDU). For example, the PPDU may comprise a STF, a LTF, a U-SIG, a UHR-SIG, an optional UHR-STF and an optional UHR-CEF, and/or the Data field as in the PPDU 1000.

The PPDU may further comprise a PE. The Data field may precede the PE. The U-SIG may comprise a PHY Version Identifier field and/or a Bandwidth field. For example, the PHY Version Identifier field may be set to a first value, for example, to indicate that the Data field may be encoded according to an EHT PHY. For example, the PHY Version Identifier field may be set to a second value, for example, to indicate that the Data field may be encoded according to a UHR PHY. The U-SIG may be in accordance with the IEEE 802.11be standard amendment.

PPDU bandwidth values may include 160 MHz, 320 MHz, 640 MHz, 1.28 GHz, 2.56 GHz and 5.12 GHz and 10.24 GHz, for example, if the PPDU may be sent (e.g., transmitted) in a band above 45 GHz. If the PPDU may be sent in a band below 7 GHz, PPDU bandwidth values may include 20 MHz, 40 MHz, 80 MHz, 160 MHz, 320 MHz and 640 GHz. The Bandwidth field may be set to a value corresponding to a bandwidth of: 20 MHz, 40 MHz, 80 MHz, 160 MHz, 320 MHz, 640 MHz, or 1.28 GHz. The Bandwidth field may be set to a value corresponding to a bandwidth of: 80 MHz, 160 MHz, 320 MHz, 640 MHz, 1.28 GHz, 2.56 GHz, 5.12 GHz, and/or 10.24 GHz. A step 1306 may include sending (e.g., transmitting) the PPDU, comprising sending (e.g., transmitting) the Data field of the PPDU using a transmitter clock rate in accordance with a value of a Bandwidth field of the U-SIG.

Figure 14:
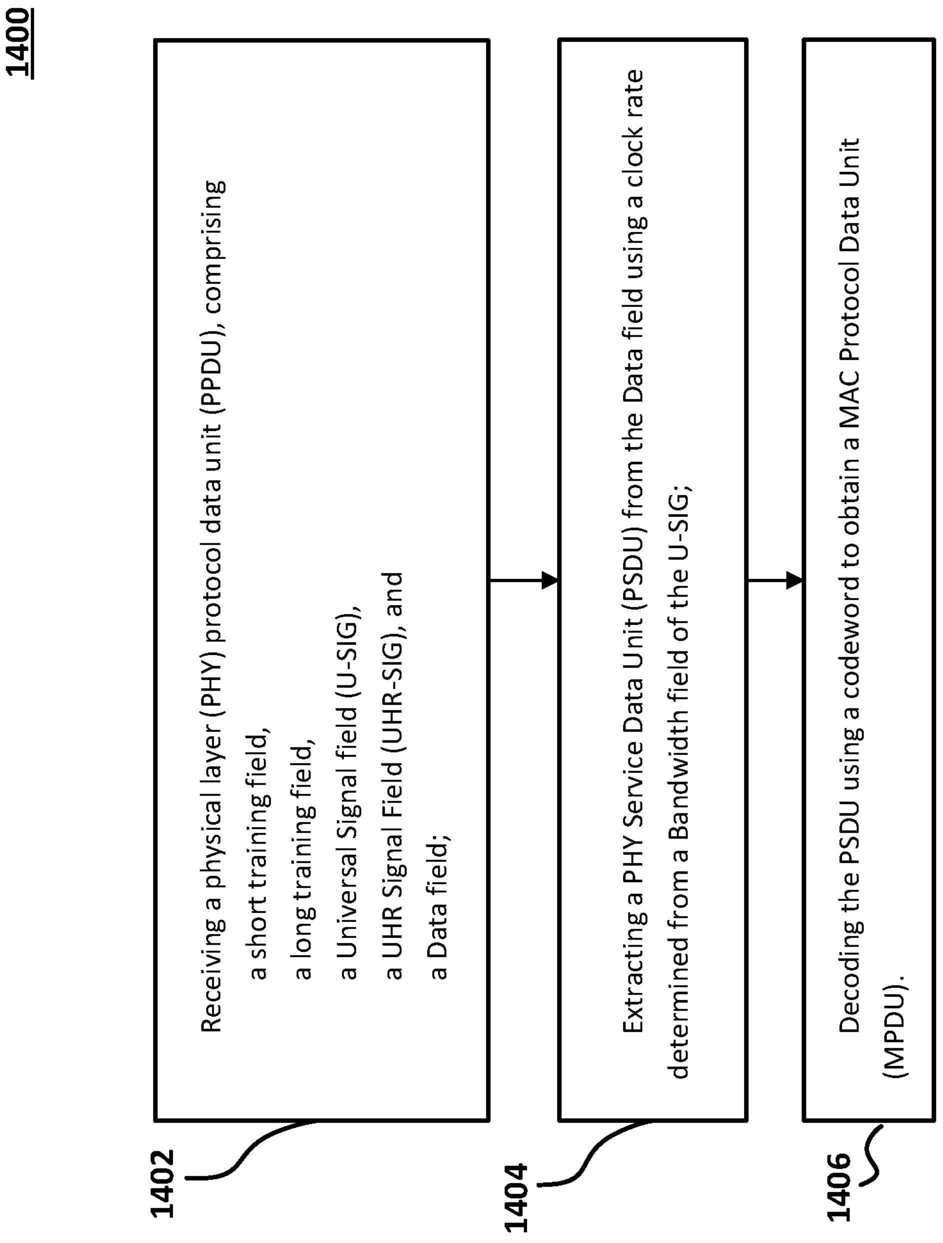
FIG. 14 shows an example method for receiving a PPDU.

FIG. 14 shows an example method for receiving a PPDU. A process 1400 may be performed by a receiver. The receiver may be a STA or an AP. As described with respect to FIG. 14, for example, a step 1402 may include receiving a physical layer (PHY) protocol data unit (PPDU). The PPDU may comprise a short training field, a long training field, a Universal Signal field (U-SIG), a UHR Signal Field (UHR-SIG), and/or the Data field as in the PPDU 1000. For example, the PPDU may further comprise a PE field. The Data field may precede the PE field. The U-SIG may be in accordance with the IEEE 802.11be standard amendment.

PPDU bandwidth values may include 160 MHz, 320 MHz, 640 MHz, 1.28 GHz, 2.56 GHz, 5.12 GHz, and/or 10.24 GHz, for example, if the PPDU may be sent (e.g., transmitted) in a band above 45 GHz. If the PPDU may be sent in a band below 7 GHz, PPDU bandwidth values may include 20 MHz, 40 MHz, 80 MHz, 160 MHz, 320 MHz, and/or 640 GHz.

The Bandwidth field may be set to a value corresponding to a bandwidth of: 20 MHz, 40 MHz, 80 MHz, 160 MHz, 320 MHz, 640 MHz, or 1.28 GHz. The Bandwidth field may be set to a value corresponding to a bandwidth of: 80 MHz, 160 MHz, 320 MHz, 640 MHz, 1.28 GHz, 2.56 GHz, 5.12 GHz, and/or 10.24 GHz. A step 1404 may include extracting a PSDU from the Data field of the PPDU, using a clock rate determined from a Bandwidth field of the U-SIG. a step 1406 may include decoding the PSDU using a codeword to obtain an MPDU. The codeword may be a Low Density Parity Check (LDPC) codeword.

Figure 15:
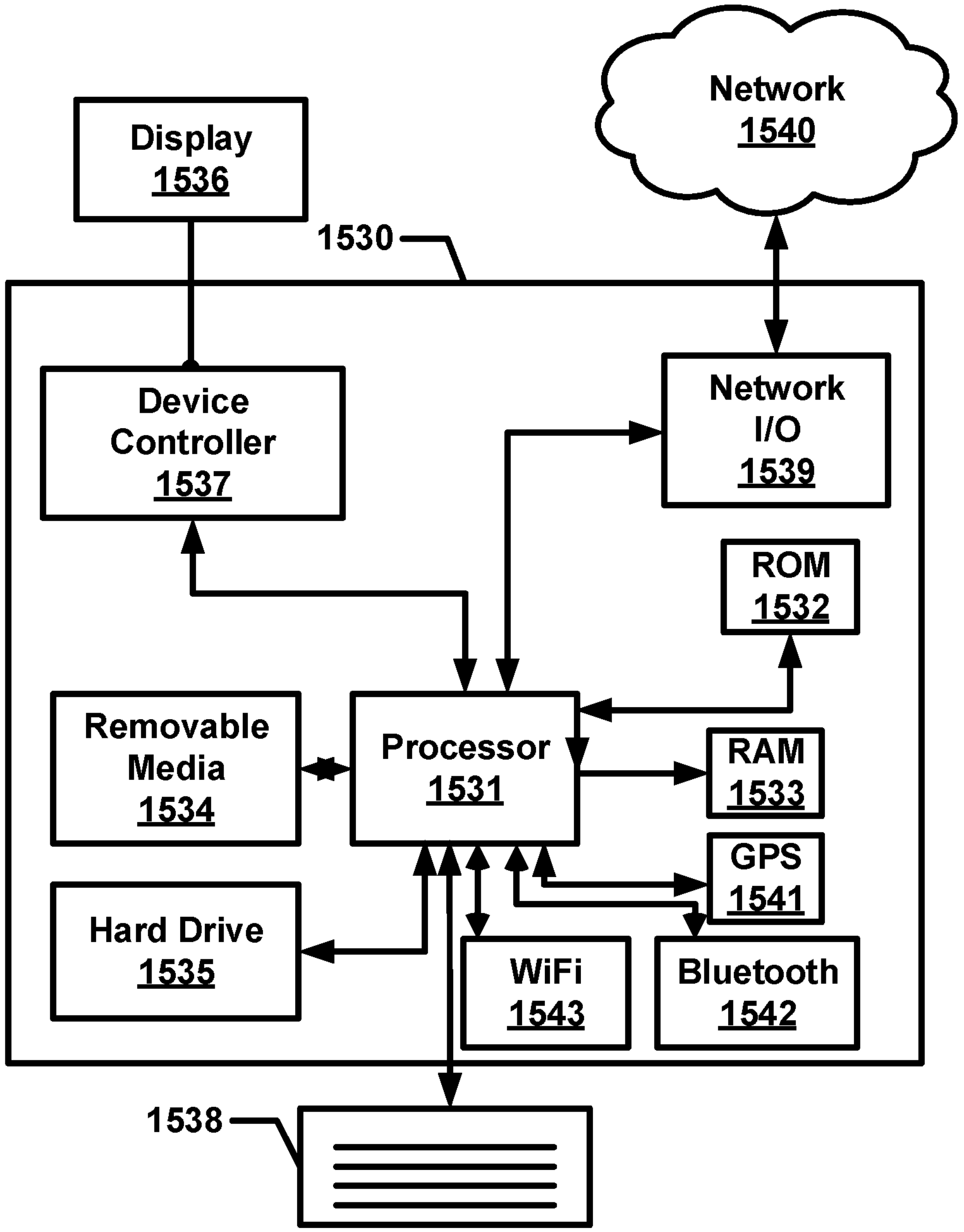
FIG. 15 shows example elements of a computing device that may be used to implement any of the various devices described herein.

FIG. 15 shows example elements of a computing device that may be used to implement any of the various devices described herein, including, for example, a computing device (e.g., wireless device and/or STA) (e.g., 106-1, 106-2, 106-3, 106-4, 106-5, 106-6, 106-7, 106-8, STA 350-1, . . . , STA 350-8), an AP (e.g., 104-1, 104-2), communication devices (e.g., 210, 260), and/or any computing and/or communication device described herein. The computing device 1530 may comprise one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also comprise a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may comprise one or more output devices, such as the display 1536 (e.g., a screen, a display device, a monitor, a television, etc.), and may comprise one or more output device controllers 1537, such as a video processor. There may also be one or more user input devices 1538, such as a remote control, keyboard, mouse, touch screen, microphone, etc. The computing device 1530 may also comprise one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may comprise a modem (e.g., a cable modem), and the external network 1540 may comprise communication links, an external network, an in-home network, a provider's wireless, coaxial, fiber, or hybrid fiber/coaxial distribution system (e.g., a DOCSIS network), or any other desired network. Additionally, the computing device 1530 may comprise a location-detecting device, such as a global positioning system (GPS) microprocessor 1541, which may be configured to receive and process global positioning signals and determine, with possible assistance from an external server and antenna, a geographic position of the computing device 1530.

The example in FIG. 15 may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. A medium access control protocol data unit may be encoded, for example, by using a codeword to obtain data. The data may be encapsulated in a message that may be configured for transmission via a first frequency band and/or via a second frequency band. The message may comprise a first field that may be associated with the first frequency band, a second field that may be associated with the second frequency band, and/or a third field that may comprise the encapsulated data. The computing device may send (e.g., transmit), to another computing device, via at least one of the first frequency band and the second frequency band. The first frequency band may be, for example, a sub-7 GHz frequency band. The second frequency band may be, for example, a 60 GHz frequency band. The first field may be modified to be associated with the second frequency. The second field may be modified to be associated with the first frequency. The first field may be modified, for example, to indicate a bandwidth of the message. The data may be a physical layer service data unit (PSDU). The message may be a physical layer protocol data unit. The message may further comprise a legacy header. The message may further comprise a training field. The message may further comprise an ultra-high reliability Header A field. The computing device may comprise one or more processors, and memory storing instructions that, when executed by the one or more processors, cause the computing device to perform the described method, additional operations and/or include the additional elements. A system may comprise a first computing device that may be configured to perform the described method, additional operations and/or include the additional elements; and a second computing device that may be configured to receive the message. A computer-readable medium storing instructions that, when executed, cause performance of: the method of any one of clauses 1 to 12.

A computing device may perform a method comprising multiple operations. A medium access control protocol data unit (MPDU) may be encoded, for example, by using a codeword to obtain a physical layer service data unit (PSDU). The PSDU may be encapsulated into a data field of a physical layer protocol data unit (PPDU). The PPDU may comprise a universal signal field (U-SIG), an ultra-high reliability signal field (UHR-SIG), and/or the data field. The computing device may send (e.g., transmit), to another computing device, the PPDU. The PPDU may further comprise a legacy header and a training field. The PPDU may further comprise a legacy short training field (L-STF) and/or a legacy channel estimation field (L-CEF). The L-STF and/or the L-CEF may precede the L-Header. The PPDU may further comprise an enhanced directional multi gigabit (EDMG) Header-A field. The EDMG Header-A field may precede the U-SIG. The PPDU may further comprise a UHR-STF and/or a UHR-CEF. The U-SIG may precede the UHR-STF and the UHR-CEF. The U-SIG may precede the UHR-SIG. The L-header may comprise a field that may indicate whether the PPDU may be a UHR PPDU. The U-SIG may comprise a PHY version identifier field. The PHY version identifier field may be set to one of a first value or a second value. The first value may indicate that the data field may be encoded according to an extremely high throughput (EHT) PHY. The second value may indicate that the data field may be encoded according to a UHR PHY. A bandwidth field may indicate a bandwidth of the PPDU. The U-SIG may be in accordance with Institute of Electrical and Electronics Engineers (IEEE) 802.11be. The U-SIG may precede the UHR-STF and the UHR-CEF. The U-SIG may follow the UHR-STF and the UHR-CEF. The PPDU may comprise a UHR Header A field. The PPDU may not include a UHR-SIG field. The U-SIG may comprise an indication of whether one or more the UHR Header A field, the UHR-STF, the UHR-CEF, and/or the UHR Header B field may be comprised in the PPDU. The bandwidth filed may indicate a value of: 80 MHz, 160 MHz, 320 MHz, 640 MHz, 1.28 GHz, 2.56 GHz, 5.12 GHz, and 10.24 GHz. The bandwidth filed may indicate a value of: 20 MHz, 40 MHz, 80 MHz, 160 MHz, 320 MHz, 640 MHz, or 1.28 GHz. The U-SIG may follow the legacy header. The PPDU may comprise in order of: The L-STF, the L-CEF, the legacy header, the U-SIG, the UHR-SIG, the data field, and the training field. A MAC Protocol Data Unit (MPDU) may be encoded using a codeword to obtain a physical layer (PHY) Service Data Unit (PSDU). The PSDU may be encapsulated into a Data field of a physical layer (PHY) protocol data unit (PPDU). The PPDU may comprise: a short training field, a long training field, a Universal Signal field (U-SIG), a UHR Signal Field (UHR-SIG), and/or the Data field. The Data field of the PPDU may be sent (e.g., transmitted), for example, by using a transmitter clock rate in accordance with a value of a Bandwidth field of the U-SIG. The PPDU may further comprise a Packet Extension Field (PE). The Bandwidth field may be set to a value corresponding to a bandwidth of: 160 MHz, 320 MHz, 640 MHz, or 1.28 GHz. The PPDU may comprise in the following order: a short training field, a long training field, a Universal Signal field (U-SIG), a UHR Signal Field (UHR-SIG), the Data field, and a PE Field. A physical layer protocol data unit (PPDU) may comprise a legacy header (L-header) that may indicate a PPDU type, for example, among a plurality of PPDU types. The plurality of PPDU types may comprise an ultra-high reliability (UHR) PPDU; a directional multi-gigabit (DMG) PPDU; and/or an enhanced DMG (EDMG) PPDU. The PPDU may comprise a universal signal field (U-SIG) and/or an ultra-high reliability signal field (UHR-SIG). A physical layer protocol data unit (PPDU) may comprise a short training field (STF); a long training field (LTF); a universal signal field (U-SIG) comprising a bandwidth field; an ultra-high reliability (UHR) signal field (UHR-SIG); and/or a data field. Sending (e.g., transmitting) the PPDU may comprise sending (e.g., transmitting) the data field of the PPDU, for example, by using a transmitter clock rate based on the bandwidth field. The computing device may comprise one or more processors, and memory storing instructions that, when executed by the one or more processors, cause the computing device to perform the described method, additional operations and/or include the additional elements. A system may comprise a first computing device that may be configured to perform the described method, additional operations and/or include the additional elements; and a second computing device that may be configured to receive the message. A computer-readable medium storing instructions that, when executed, cause performance of: the method of any one of clauses 1 to 12.

A computing device may perform a method comprising multiple operations. The computing device may receive, from another computing device, a message via at least one of a first frequency band and a second frequency band. Data may be extracted from the message. The message may comprise a first field that may be associated with the first frequency band; a second field that may be associated with the second frequency band; and/or a third field that may comprise the encapsulated data. The data may be decoded, for example, by using a codeword to obtain a medium access control protocol data unit. The first frequency band may be a sub-7 GHz frequency band. The second frequency band may be a 60 GHz frequency band. The computing device may receive, from another computing device, a physical layer protocol data unit (PPDU) that may comprise a legacy header (L-header), a Universal Signal field (U-SIG), a UHR Signal Field (UHR-SIG), a Data field, and/or a training field (TRN). A physical layer Service Data Unit (PSDU) may be extracted from the Data field of the PPDU. The PSDU may be decoded, for example, by using a codeword to obtain a MAC Protocol Data Unit (MPDU). The L-header may comprise a field indicating whether the PPDU may be a UHR PPDU. The U-SIG may comprise a PHY Version Identifier filed and a bandwidth field. The Bandwidth field may be set to a value corresponding to a bandwidth of: 160 MHz, 320 MHz, 640 MHz, or 1.28 GHz. The computing device may receive, from another computing device, a physical layer protocol data unit (PPDU) that may comprise a short training field, a long training field, a Universal Signal field (U-SIG), a UHR Signal Field (UHR-SIG), and/or a Data field. A physical layer Service Data Unit (PSDU) may be extracted from the Data field, for example, using a clock rate. The clock rate may be determined from a Bandwidth field of the U-SIG. The PSDU may be decoded, for example, using a codeword to obtain a MAC Protocol Data Unit (MPDU). The PPDU may further comprise a Packet Extension Field (PE). The Bandwidth field may be set to a value corresponding to a bandwidth of: 160 MHz, 320 MHz, 640 MHz, 1.28 GHz, 2.56 GHz, 5.12 GHz or 10.24 GHz. The PPDU may comprise in the following order: a short training field, a long training field, a Universal Signal field (U-SIG), a UHR Signal Field (UHR-SIG), the Data field, and a PE Field. The computing device may comprise one or more processors, and memory storing instructions that, when executed by the one or more processors, cause the computing device to perform the described method, additional operations and/or include the additional elements. A system may comprise a first computing device that may be configured to perform the described method, additional operations and/or include the additional elements; and a second computing device that may be configured to receive the message. A computer-readable medium storing instructions that, when executed, cause performance of: the method of any one of clauses 1 to 12.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

An access point (and an AP MLD) may communicate with one or more wireless devices (e.g., computing device(s), non-AP MLD(s), station(s), etc.). Computing devices described herein may support multiple technologies, and/or multiple releases of the same technology. Computing devices may have some specific capability(ies) depending on wireless device category and/or capability(ies). Computing devices referred to herein may correspond to a plurality of computing devices compatible with a given LTE, 5G, 6G, 3GPP or non-3GPP release, IEEE 802.11 Standard(s) (e.g., IEEE 802.11be, beyond IEEE 802.11be), or Wi-Fi Alliance (WFA) Standard(s) (e.g., Wi-Fi 7, Wi-Fi 8) technology. A plurality of computing devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of access points and/or a plurality of wireless devices in a coverage area that may not comply with the disclosed methods, for example, because those wireless devices and/or access points may perform based on other (e.g., older or newer) releases of LTE, 5G, 6G, 3GPP or non-3GPP, IEEE 802.11 Standards (e.g., IEEE 802.11be, beyond IEEE 802.11be), or Wi-Fi Alliance (WFA) Standards (e.g., Wi-Fi 7, Wi-Fi 8) technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as access points (APs), AP multi-link devices (MLDs), stations (STAs), non-AP STAs, non-AP MLDs, base stations, wireless devices or user equipment (wireless device), servers, switches, antennas, and/or the like. A network may comprise any wireless technology, including but not limited to, cellular, wireless, Wi-Fi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:

encapsulating data in a message configured for transmission via one of a first protocol using a first frequency band and a second protocol using a second frequency band, wherein the message comprises:

a first field associated with the first frequency band;

a second field associated with the second frequency band; and a third field comprising the encapsulated data; and selecting, among the first protocol and the second protocol, a protocol and a corresponding frequency band to be used for transmission of the message; and transmitting the message using the selected protocol via the corresponding frequency band.

2. The method of claim 1, further comprising encoding a medium access control protocol data unit using a codeword to obtain the data.

3. The method of claim 1, wherein the first frequency band is a sub-7 GHz frequency band; and the second frequency band is a 60 GHz frequency band.

4. The method of claim 1, wherein the selecting comprises, based on the first protocol being selected, selecting the first frequency band as the corresponding frequency band.

5. The method of claim 1, wherein:

the first protocol is an extremely high throughput (EHT) protocol; and the second protocol is a millimeter-wave (mmWave) protocol.

6. The method of claim 1, wherein the message is a physical layer protocol data unit (PPDU).

7. The method of claim 1, wherein the message further comprises a fourth field that comprises a value indicating which protocol, among the first protocol and the second protocol, is to be selected.

8. A method comprising:

encoding a medium access control protocol data unit (MPDU) using a codeword to obtain a physical layer service data unit (PSDU); and encapsulating the PSDU into a data field of a physical layer protocol data unit (PPDU), wherein the PPDU comprises:

a universal signal field (U-SIG), an ultra-high reliability signal field (UHR-SIG), and the data field; and transmitting the PPDU.

9. The method of claim 8, wherein the PPDU further comprises a legacy short training field (L-STF), an L-Header, and a legacy channel estimation field (L-CEF), wherein L-STF and L-CEF fields precede the L-Header.

10. The method of claim 8, wherein the PPDU further comprises an enhanced directional multi gigabit (EDMG) Header-A field, wherein the EDMG Header-A field precedes the U-SIG.

11. The method of claim 8, wherein the PPDU further comprises:

a UHR-STF; and a UHR-CEF, wherein the U-SIG precedes the UHR-STF and the UHR-CEF.

12. The method of claim 8, wherein the U-SIG precedes the UHR-SIG.

13. The method of claim 8, wherein the PPDU comprises an L-Header, and wherein the L-Header comprises a field indicating whether the PPDU is a UHR PPDU.

14. The method of claim 8, wherein the U-SIG comprises:

a PHY version identifier field, wherein the PHY version identifier field is set to one of a first value or a second value, wherein the first value indicates that the data field is encoded according to an extremely high throughput (EHT) PHY, and wherein the second value indicates that the data field is encoded according to a UHR PHY; and a bandwidth field, wherein the bandwidth field indicates a bandwidth of the PPDU.

15. The method of claim 8, wherein the U-SIG is in accordance with Institute of Electrical and Electronics Engineers (IEEE) 802.11be.

16. A method comprising:

selecting, among a first protocol corresponding to a first frequency band and a second protocol corresponding to a second frequency band, a protocol and a corresponding frequency band to be used for reception of a message;

receiving the message using the selected protocol via the corresponding frequency band;

extracting data from the message, wherein the message comprises:

a first field associated with the first frequency band;

a second field associated with the second frequency band; and a third field comprising encapsulated data.

17. The method of claim 16, further comprising decoding the data using a codeword to obtain a medium access control protocol data unit.

18. The method of claim 16, wherein the first frequency band is a sub-7 GHz frequency band; and the second frequency band is a 60 GHz frequency band.

19. The method of claim 16, wherein the selecting comprises, based on the first protocol being selected, selecting the first frequency band as the corresponding frequency band.

20. The method of claim 16, wherein the first field is in accordance with Institute of Electrical and Electronics Engineers (IEEE) 802.11be.

* * * * *